United States Patent
Duncan

(10) Patent No.: US 7,226,070 B1
(45) Date of Patent: Jun. 5, 2007

(54) SEMIAUTOMATIC VISUAL TRAILERING GUIDE

(76) Inventor: Michael Wayne Duncan, 5230 Hurryville Rd., Farmington, MO (US) 63640

( * ) Notice: Subject to any disclaimer, the term of this patent is extended or adjusted under 35 U.S.C. 154(b) by 0 days.

(21) Appl. No.: 11/105,595

(22) Filed: Apr. 15, 2005

(51) Int. Cl.
B60D 1/40 (2006.01)

(52) U.S. Cl. ............... 280/477; 280/414.1; 116/51

(58) Field of Classification Search ............ 280/477, 280/414.1; 116/28 R, 51; 33/264
See application file for complete search history.

(56) References Cited

U.S. PATENT DOCUMENTS

| 3,064,617 | A |  | 11/1962 | Meager |
| 3,447,815 | A |  | 6/1969 | West |
| 3,520,273 | A |  | 7/1970 | Daifotes |
| 3,863,594 | A |  | 2/1975 | Gawthrop |
| 3,889,384 | A |  | 6/1975 | White |
| 4,529,217 | A |  | 7/1985 | Wood |
| 4,684,145 | A | * | 8/1987 | Tingley ............ 280/414.1 |
| 4,715,768 | A |  | 12/1987 | Capps |
| 4,958,436 | A |  | 9/1990 | Tusche |
| 5,113,588 | A |  | 5/1992 | Walston |
| 5,596,944 | A |  | 1/1997 | Massie |
| 5,755,453 | A |  | 5/1998 | Bell |
| 6,318,747 | B1 |  | 11/2001 | Ratican |
| 2003/0200911 | A1 |  | 10/2003 | Tateo et al. |
| 2004/0011273 | A1 |  | 1/2004 | Gorbutt |
| 2004/0211351 | A1 |  | 10/2004 | Emerson et al. |

* cited by examiner

Primary Examiner—Kevin Hurley

(57) ABSTRACT

A semiautomatic visual trailing guide to assist a steerer in backing and loading trailers such as boat, recreational vehicle, or utility type. The device generally consists of a self-boosting self-latching mechanism capable of pivoting an element between a horizontal position and a vertical position while employing a force to hold in either position. The device is mounted on the rear most center of a trailer and will rotate the element to a visual position after being initially urged towards that position. The element is kept vertical by tension from the self-boosting self-latching mechanism until a forward force such as a boat, jet ski, or car push on the element and the element collapses to a horizontal position.

1 Claim, 4 Drawing Sheets

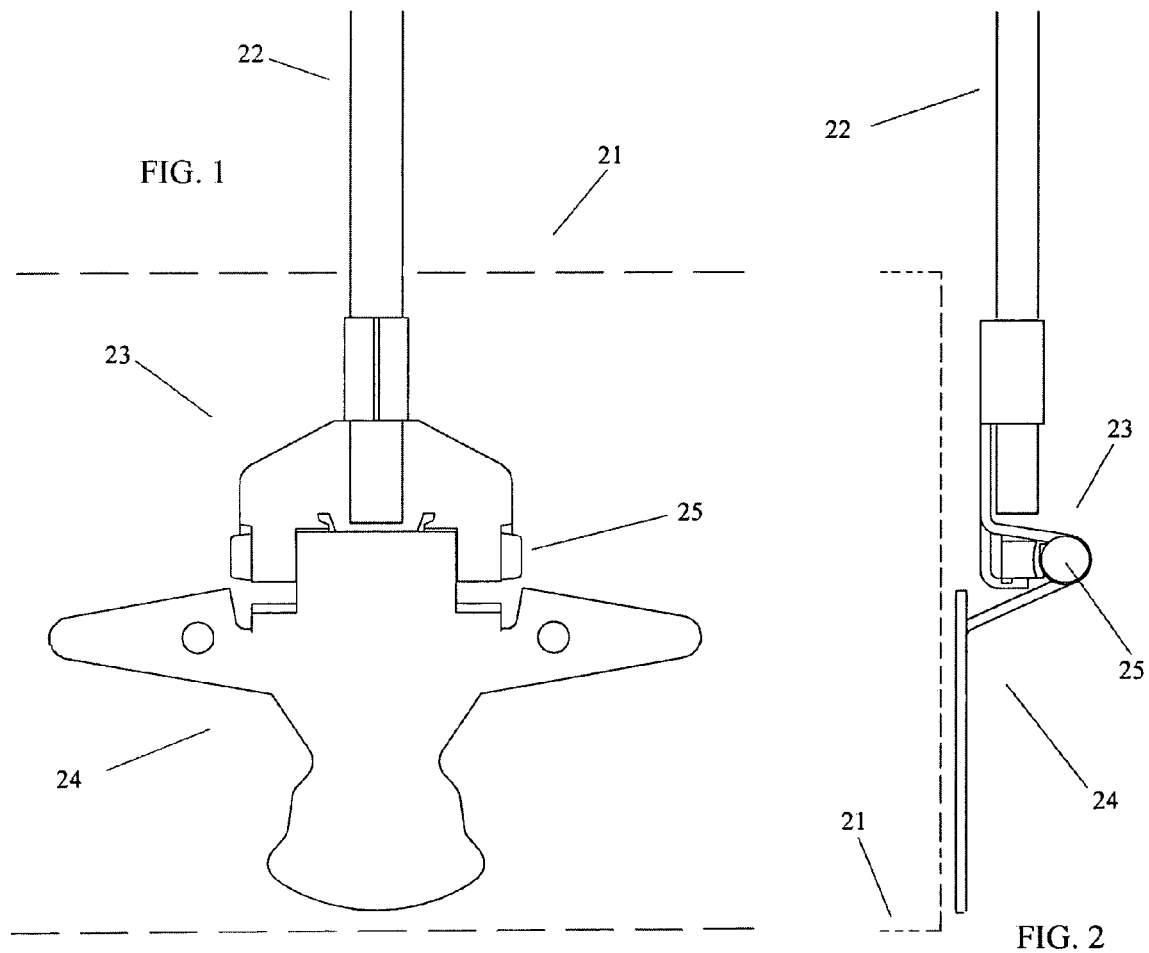
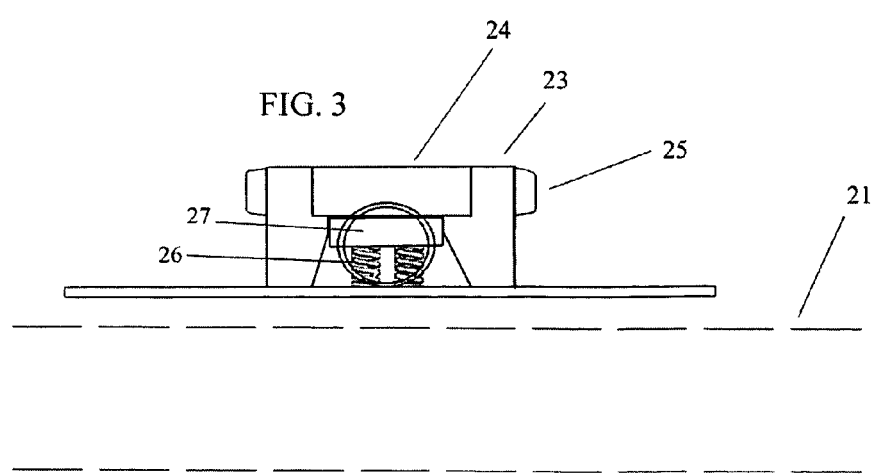

SEMIAUTOMATIC VISUAL TRAILERING GUIDE

CROSS-REFERENCE TO RELATED APPLICATIONS

Design Patent Application serial No. 29/194,752 now abandoned.

Utility patent application Ser. No. 10/725,087 now abandoned.

STATEMENT REGARDING FEDERALLY SPONSORED RESEARCH OR DEVELOPMENT

Not Applicable.

REFERENCE TO A SEQUENCE LISTING, A TABLE, OR A COMPUTER PROGRAM

Not Applicable.

LISTING COMPACT DISC APPENDIX

Not Applicable.

BACKGROUND OF THE INVENTION

The invention relates to a visual trailering guide for use in backing up trailers to a specific location for parking, centering a trailer on a ramp leading into the water, and for use in guiding and centering a boat when loading the boat on a trailer that is partially underwater. Devices of many configurations have been developed to aid in the ability of a steerer to back an empty trailer. Some of these devices are discussed herein as way of examples of prior art.

U.S. Pat. No. 4,715,768 issued Dec. 29, 1987, Capps, discloses a trailer guide, which allows the rollers to float upward as the trailer backs into the water. The rollers become submersed and unviewable for guiding the boat onto the trailer.

U.S. Pat. No. 4,958,436 issued Sep. 25, 1990, Tusche, U.S. Patent No. 2003/0200911 A1 issued Oct. 30, 2003, Tateo et al., and U.S. Patent No. 2004/0211351 A1 issued Oct. 28, 2004, Emerson et al., show a spring and bracket type device affixed to a trailer for viewing. This type of configuration employs constant spring tension pushing the device against the boat at all times and may eventually wear or scar the boat.

U.S. Pat. No. 4,529,217 issued Jul. 16, 1985, Wood, and U.S. Pat. No. 3,447,815 issued Jun. 3, 1969, West, in each case, movement of the upward projecting arms, that act as guides, is from side to side. Devices of this design tend to remain substantially vertical at all times. This side-to-side motion of the guide arms usually requires the trailer to be some distance from the dock to facilitate such movement.

U.S. Pat. No. 3,863,594 issued Feb. 4, 1975, Gawthrop, shows a spring and bracket type device that locks into position by detent means. This device works much like U.S. Pat. No. 5,755,453 issued May 26, 1998, Bell, wherein these types of devices are maneuvered by hand to the full vertical position to engage the locking mechanism, which increases the time and effort of the user.

U.S. Pat. No. 3,520,273 issued Jul. 14, 1970, Daifotes, shows a device that uses heat to release the device into its viewable position. This device is mechanically complex, expensive and difficult to install.

U.S. Pat. No. 5,596,944 issued Jan. 28, 1997, Massie, discloses an automatic deployment device. It requires two of these devices mounted on each side of the trailer to function properly, increasing cost and difficulty of installation.

U.S. Pat. No. 3,064,617 issued Nov. 20, 1962, Meager, and U.S. Patent No. 2004/0011273 A1 issued Jan. 22, 2004, Gorbutt, show a device mounted on the front tongue of the trailer as opposed to the rear of the trailer. These devices do not provide a visual reference to the rear of the trailer.

U.S. Pat. No. 4,684,145 issued Aug. 4, 1987 to Tingley discloses an automatic deployment type of device that extends the full with of the trailer. This device maintains constant contact on craft when the craft is loaded and may damage the craft. This device is complicated, costly and difficult to install.

U.S. Pat. No. 6,318,747 B1 issued Nov. 20, 2001, Ratican, U.S. Pat. No. 5,113,588 issued May 19, 1992, Walston, and U.S. Pat. No. 3,889,384 issued Jun. 17, 1975, White, all show devices that must be manually locked into position and manually unlocked to reposition, then manually relocked. This would be too difficult for the user of a water-type craft such as a boat.

SUMMARY OF THE INVENTION

The semiautomatic visual trailering guide of this invention consists of an element coupled to a self-boosting self-latching mechanism secured centrally to the rear of a conventional type trailer. The element resembles an elongated rod. The self-boosting self-latching mechanism resembles a spring loaded moveable joint, having a fixed plate mounted to the rear of the trailer and a moveable plate that supports the element. The self-boosting self-latching mechanism has structure to hold the moveable plate in the horizontal position and springs to assist in pivoting the moveable plate from the horizontal position to the vertical position. The springs also hold the moveable plate in the vertical position. The element is coupled to the moveable plate and as the moveable plate pivots from the horizontal position to the vertical position, the element pivots from the horizontal position to the vertical position.

A steerer would slightly lift the element from the horizontal position to overcome the mechanism's force that holds the element in the horizontal position and the self-boosting self-latching mechanism automatically engages the self-boosting action of the mechanism to raise and hold the element in the vertical position. With the element in the vertical position, visual contact with the element is available at all times, aiding the steerer in guiding the trailer while backing into awkward turns and especially for entering steep graded ramps where visual contact is impaired. In addition the steerer of the boat would have a reference to the center and rear of the submerged trailer for guiding the boat onto the trailer.

In respect to prior art of known types of aids for helping steerers and of known different types of designs and configurations for visual trailering devices, the present new and different invention overcomes disadvantages of prior art. The present invention overcomes disadvantages of prior art by its structure, functioning abilities, and ease of installation as well as use. These and other objects and features of the present invention will be better understood and appreciated from the following detailed description of the main embodiment thereof, selected for purposes of illustration and shown in the accompanying drawings.

BRIEF DESCRIPTION OF THE SEVERAL VIEWS OF THE DRAWING

FIG. 1 illustrates a front view of the preferred embodiment of the device of the present invention in the vertical position.

FIG. 2 illustrates a side view of the preferred embodiment of the device of the present invention in the vertical position.

FIG. 3 illustrates a top view of the preferred embodiment of the device of the present invention in the vertical position without the element in place.

DETAILED DESCRIPTION OF THE INVENTION

Figures 2A, 2B:
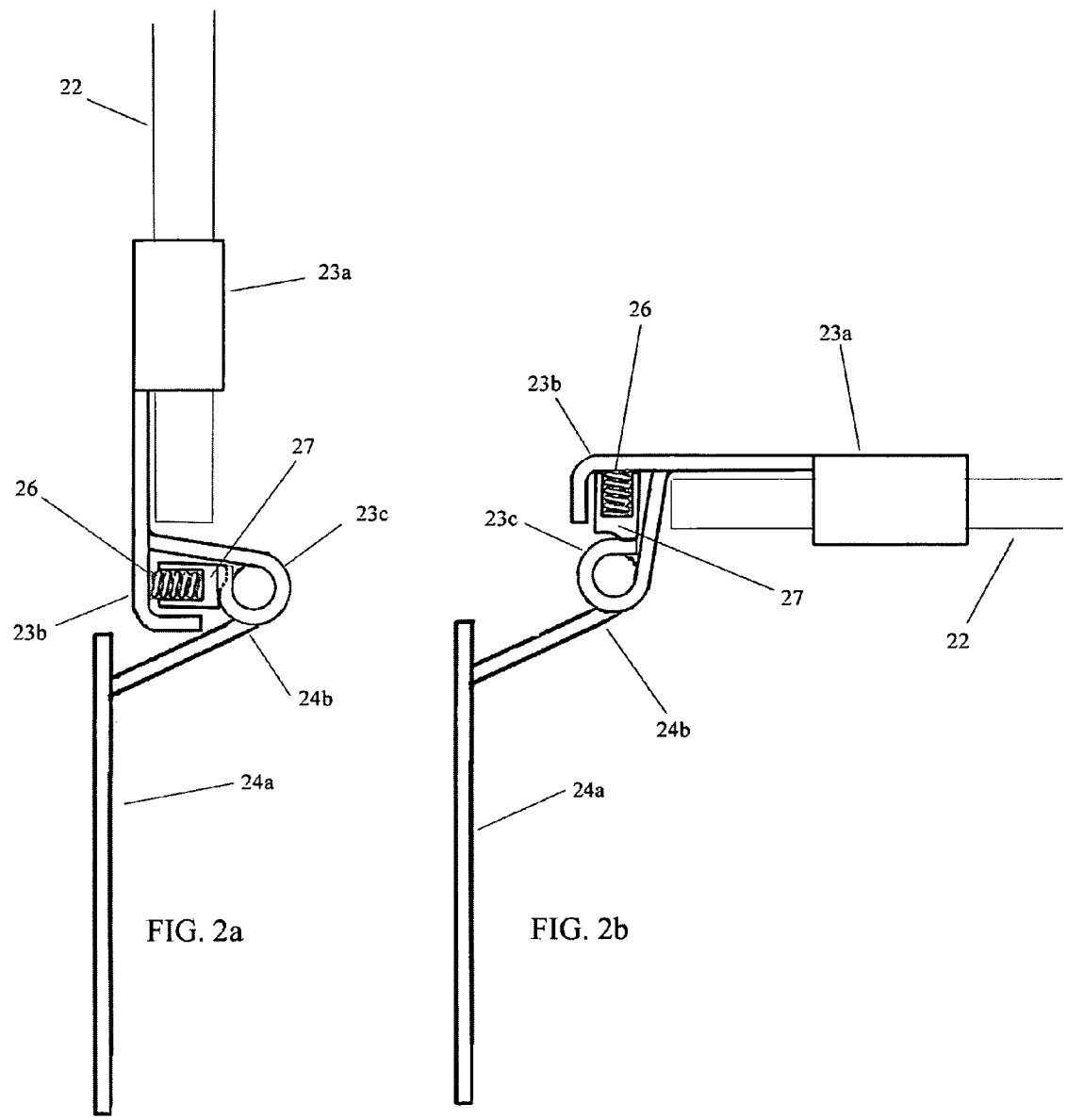
FIG. 2a illustrates a side view of the preferred embodiment of the device of the present invention showing the structure of the self-boosting self-latching mechanism holding the element in the vertical position without the pin in place.
FIG. 2b illustrates a side view of the preferred embodiment of the device of the present invention showing the structure of the self-boosting self-latching mechanism holding the element in the horizontal position without the pin in place.

Referring now to the drawings, illustrating the preferred embodiment of the semiautomatic visual trailering guide of this invention. The preferred embodiment and the best mode contemplated of the present invention are herein summarize. However, the best mode for carrying out the invention hereinafter described is by way of illustration and not by way of limitation. It is intended that the scope of the invention includes all modifications that incorporate the invention's principle design features.

The semiautomatic visual trailering guide of this invention comprises an element 22 resembling an elongated rod and a self-boosting self-latching mechanism 23-27 resembling a spring loaded moveable joint, having a fixed plate 24 mounted to the rear of a trailer 29 and a moveable plate 23 supporting the element 22.

Figure 4:
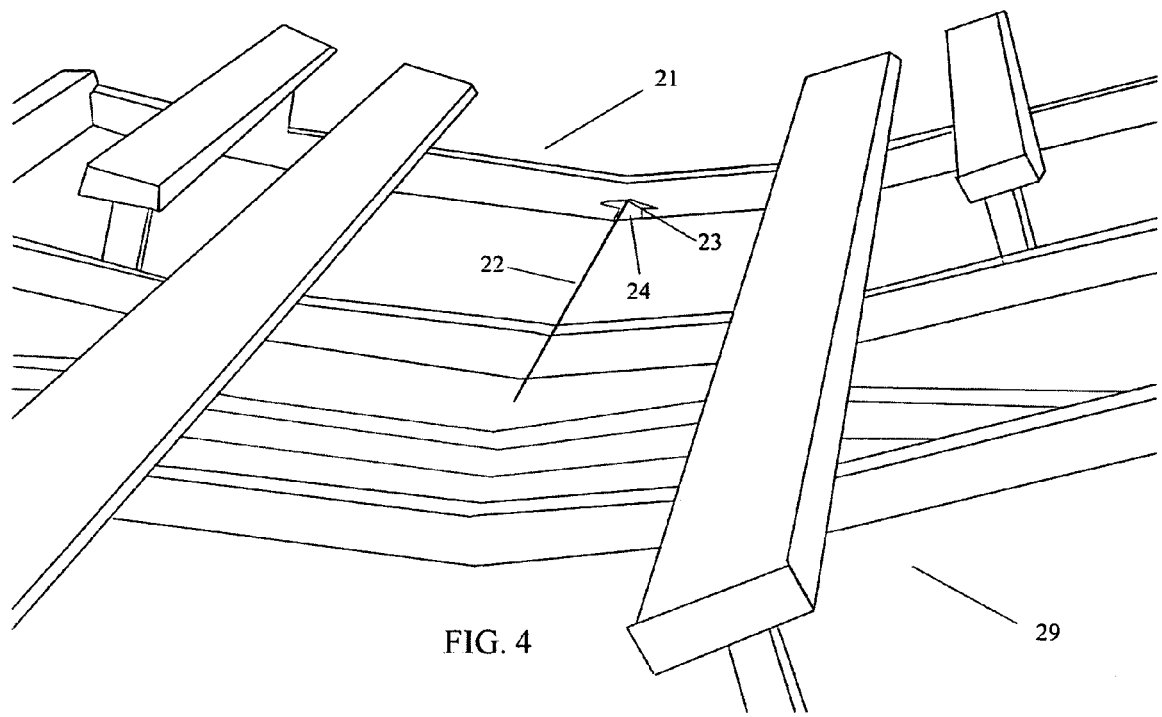
FIG. 4 shows a typical application of the present invention mounted thereto a horizontal cross support member towards the end of a trailer and in the horizontal or storage position.

The fixed plate 24 has a bent flange 24a that is mounted to the rear of the trailer 29 typically on a forward surface of a rear most horizontal cross support member 21 of the trailer 29 as illustrated in FIG. 4. Attachment by rivets, screws, welding or any other means suitable for the application will suffice. The moveable plate 23 and fixed plate 24 may be formed from stock material such as stainless steel, brass, plastic, or the like.

Figure 6:
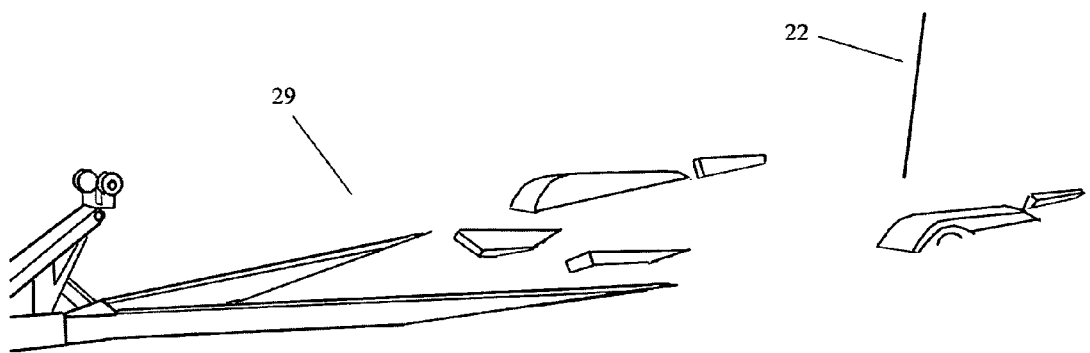
FIG. 6 shows a typical application of the present invention mounted thereto a horizontal cross support member towards the end of a partially submerged trailer and in the vertical or backing the trailer position.

The element 22 is coupled to the bent flange 23a of the moveable plate 23 such that as the moveable plate 23 pivots, the element 22 pivots from the horizontal position to the vertical position or vice versa. The element 22 may be clamped or attached in any suitable manner to the bent flange 23a. In the preferred embodiment the method of via press fit is preferred for the element 22 and the moveable plate 23 to pivot together as a single unit and in a single motion by curling the outer end of the bent flange 23a to create a support to hold the element 22. The element 22 may be formed from inexpensive stock materials such as fiberglass or the like. The exact length will vary determined by the particular application. The element 22 needs to have sufficient length to allow the element 22 to extend upward in the vertical position from the trailer 29 to a height at which the top of the element 22 extends above an expected water height when the trailer 29 becomes submerged as illustrated in FIG. 6.

The self-boosting self-latching mechanism 23-27 of this invention is a moveable joint type structure with the ability to hold the moveable plate 23 in the horizontal position and springs 26 to assist in pivoting the moveable plate 23 from the horizontal position to the vertical position comprising a moveable plate 23 and a fixed plate 24, springs 26, a plunger 27, and a pin 25. The springs 26 as illustrated in FIG. 3 that may be formed from steel or the like, also holds the moveable plate 23 in the vertical position. Pin 25 that may be formed from steel, plastic or the like, pivotally couples together the moveable plate 23 and the fixed plate 24, in a manner typical of most moveable joints. Pin 25 is pressed through the curled flanges 23c and 24b of the moveable plate 23 and the fixed plate 24, which holds the self-boosting self-latching mechanism 23-27 together.

The self-boosting self-latching mechanism 23-27 is adapted to perform the three functions of hingedly supporting the element 22 and upon being manually initiated engaging a self-boosting action that urges the element 22 to the vertical position and latching the element 22 in the vertical position. Wherein more effective latching of the element 22 is achieved since each self-boosting self-latching mechanism 23-27 incorporates the boosting and latching functions inherent in the self-boosting self-latching mechanism 23-27. First, the element 22 is coupled to the bent flange 23a of the self-boosting self-latching mechanism 23-27. The moveable plate 23 and the element 22 are held in the horizontal position as illustrated in FIG. 2b. Second, a self-boosting action is initiated by a slight lifting action to release the moveable plate 23 from the horizontal position whereas the springs 26 and the plunger 27 automatically pivot the moveable plate 23 that raises the element 22 from the horizontal position to the vertical position. Third, as the moveable plate 23 approaches the vertical position a self-latching action occurs to hold the element 22 in the vertical position for use as illustrated in FIG. 2a.

After a forward force is applied to the vertical element 22, the moveable plate 23 pivots towards the horizontal position overcoming the self-latching action of the self-boosting self-latching mechanism 23-27. As the moveable plate 23 approaches the horizontal position the spring(s) 26 and the plunger 27 apply a force to further urge the moveable plate to the horizontal position for storage as illustrated in FIG. 2b. While in the horizontal position the element 22 is held away from the boat 30 when the boat 30 has been loaded on the trailer 29. This prevents any damage from occurring to the bottom of the boat 30 by the element 22.

Movement of the element 22 with the self-boosting self-latching mechanism 23-27 is characterized by a spring and cam action with at least one spring 26 telescoped into at least one hole in the plunger 27. The springs 26 and the plunger 27 assembly makes use of the bent flange 23b, the curled flanges 23c and 24b to urge and hold the element 22 to a vertical position. The plunger 27 that may be formed from woods, metals, ceramics, plastic or the like, and may be formed into various shapes such as spiracle, flat, cubed or the like, is slideably positioned inside the bent flange 23b. With the face of the plunger 27 resting against the surface of the curled flange 24b in a position between the curled flanges 23c and is pressed into engagement with curled flange 24b. The plunger 27 springs 26 inserted into holes in the plunger 27 with the outer end of the springs 26 resting against the surface of the moveable plate 23 in a position inside the bent flange 23b to supply bias between the fixed plate 24 and the moveable plate 23. A biasing force that urges the element 22 to pivot from the horizontal position to the vertical position. This configuration provides a holding action when in the horizontal position, a biasing force toward the vertical position and a latching action when in the vertical position to automatically lift the element 22 upward and hold the element 22 in a vertical position after the element 22 has initially been swung toward its vertical position.

Figure 5:
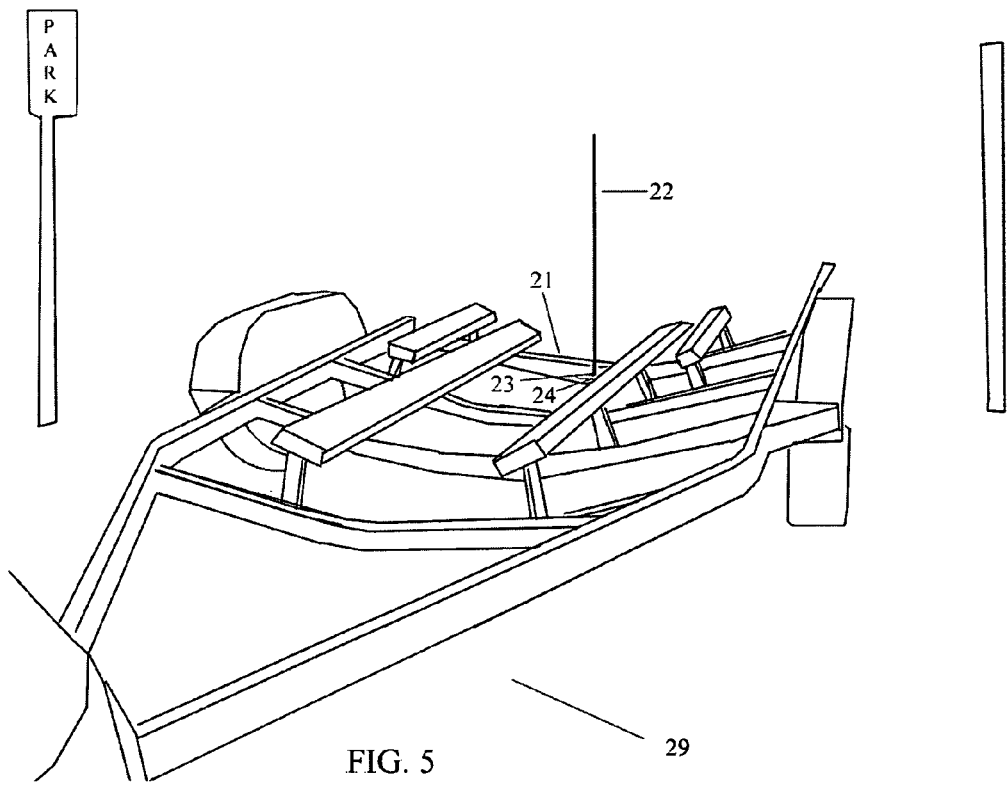
FIG. 5 shows a typical application of the present invention mounted thereto a horizontal cross support member towards the end of the trailer and in the vertical or backing the trailer position.
Figure 7:
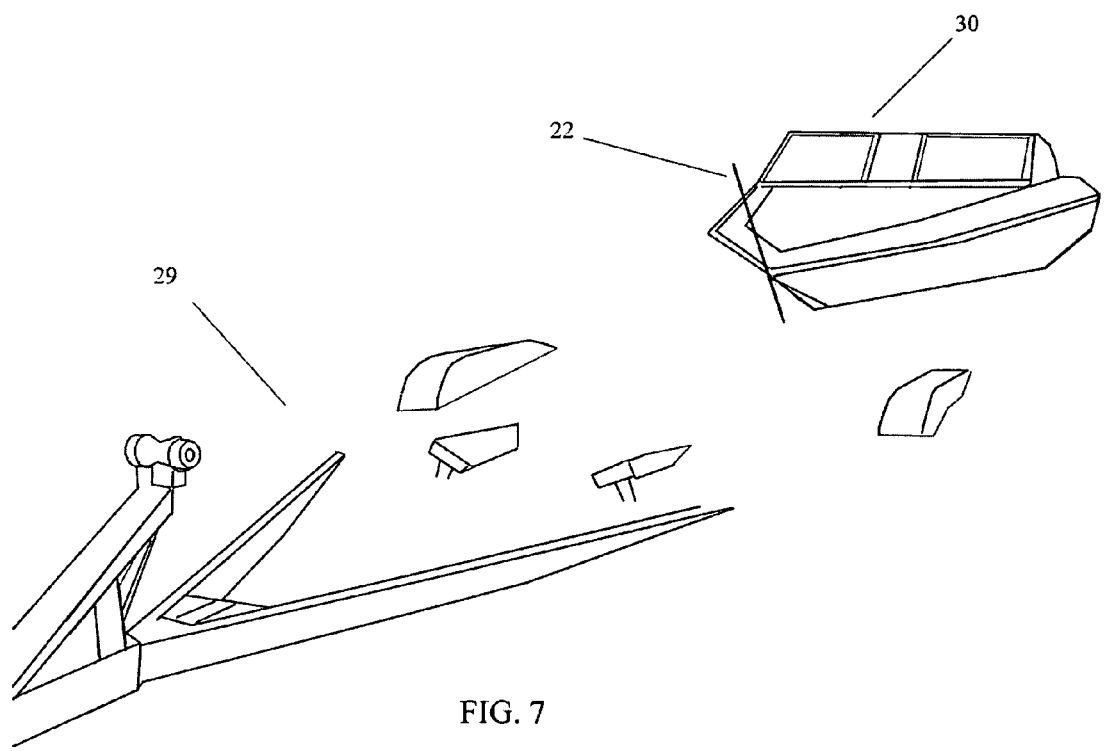
FIG. 7 shows a typical application of the present invention mounted thereto a horizontal cross support member towards the end of a partially submerged trailer and in the vertical or loading the trailer position.

To use the self-boosting self-latching mechanism 23-27 just initiate movement of the element 22 into the vertical position and the self-boosting self-latching mechanism 23-27 will assist in pivoting to and holding in the full vertical position the element 22. Making the element 22 easily viewable from the window or mirror of the vehicle to which the trailer 29 is hitched. Therefore, should the trailer 29 be a trailer 29 as that used for a boat 30 and placed into the water a certain distance, the element 22 would be of sufficient height to be in view at all times. This would allow the steerer a reference point to direct the bow of the boat 30 onto the trailer 29 during loading to ensure that the boat 30 is traveling along the central axis of the trailer 29, as illustrated in FIG. 7, and that the bow of the boat 30 is centrally positioned on the trailer 29 when the boat 30 is winched into place. Reloading the boat 30 would be a simpler task for the steerer, especially in adverse conditions such as night, rain or other conditions that may decrease visibility. In addition, if the trailer 29 were empty, the steerer of the vehicle to which the trailer 29 is hitched would have a reference point along the central axis toward the rear end of the trailer 29 for backing the trailer 29 into position. For example, into a designated parking area as illustrated in FIG. 5, or down a ramp leading into the water, as illustrated in FIG. 6.

While there has been described above the principles of the semiautomatic visual trailering guide of the present invention in connection with specific apparatus, it is understood that this description is made only by way of example and not as a limitation to the scope of my invention. Certain modifications and improvements will occur to those skilled in the art upon reading the foregoing description. Accordingly, it is intended that the scope of the present invention not be limited by the foregoing description, instead it should be measured with regards to the claims that follow.

What is claimed is:

1. A semiautomatic visual trailering guide comprising:
   a self-boosting self-latching mechanism comprising:
   a fixed plate attached to a center rearward position on a trailer, the plate having a curled flange;
   a moveable plate having curled flanges corresponding to the curled flange on the fixed plate;
   a pin inserted into openings at the ends of the curled flanges on the fixed and moveable plates to pivotally attach the moveable plate to the fixed plate;
   a plunger slideably positioned inside of the curled flanges on the moveable plate with a face of the plunger resting against a surface of the fixed plate in a position under the curled flange on the fixed plate;
   at least one spring inserted into a hole in the plunger with the outer end of at least one spring resting against a surface of the moveable plate in a position inside of the curled flanges of the moveable plate to supply bias between the fixed plate and the moveable plate to pivot the moveable plate from a horizontal position to a vertical position, to provide a holding action when in a horizontal position, and a latching action when in the vertical position;
   an element rigidly attached to the moveable plate so that the moveable plate and the element rotate as a single unit with the element pivoting between a horizontal position and a vertical position with the moveable plate.

* * * * *